UNITED STATES PATENT OFFICE.

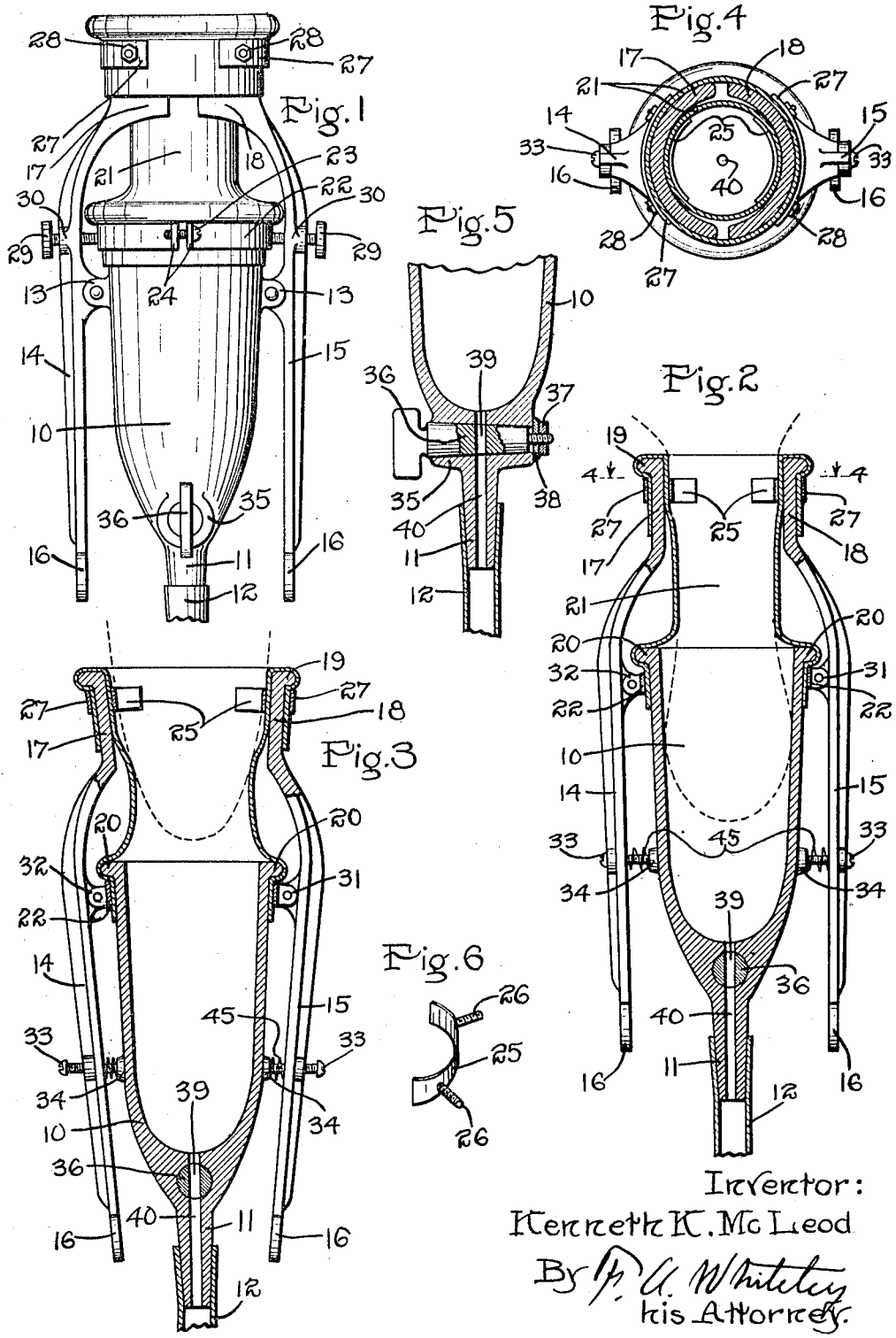

KENNETH K. McLEOD, OF ST. PAUL, MINNESOTA.

TEAT-CUP.

1,270,308.

Specification of Letters Patent.   Patented June 25, 1918.

Application filed August 5, 1916.   Serial No. 113,380.

*To all whom it may concern:*

Be it known that I, KENNETH K. MCLEOD, a citizen of the United States, residing at St. Paul, in the county of Ramsey and State of Minnesota, have invented certain new and useful Improvements in Teat-Cups, of which the following is a specification.

My invention relates to teat cups employed with pneumatic milking machines and has for its object to provide a teat cup having an expansible upper portion which is adapted to fit any size of teat to hold the cup in place thereon. In carrying out my object I employ a lower member of fixed character to which is pivoted a pair of arms terminating in upper members of similar configuration with the lower member. The upper members are connected to the lower member by a rubber tube so that pressing the arms together spreads apart the upper members, thus increasing the size of the opening in the top of the teat cup.

The full objects and advantages of my invention will appear in connection with the detailed description thereof and are particularly pointed out in the claims.

In the drawing, illustrating the application of my invention in one form,—

Figure 1 is an elevational view of one form of my teat cup. Fig. 2 is a central sectional elevational view of another form of my invention. Fig. 3 is a view similar to Fig. 2 with some of the parts in relatively altered positions. Fig. 4 is a plan sectional view taken on line 4—4 of Fig. 2. Fig. 5 is an elevational sectional view of the lower portion of the teat cup taken along a plane at right angles to that of Fig. 2. Fig. 6 is a perspective view of one of the members used for fastening the rubber tube to the upper portion of the device.

In ordinary practice a conical form of teat cup is employed in which the teat is held in place through the suction of the milking machine. In this form the teat is drawn down into the throat of the cup and the passageway through the teat near the end of the same is partially closed up, rendering it somewhat difficult to draw the milk from the cow's udder. My invention overcomes this difficulty by elongating the teat cup so that it is impossible for any teat to reach the throat of the cup and be there squeezed together to close the passageway within the teat. In order to hold the cup in place upon the teat I hence employ an expansible upper member which is adapted to close in upon the teat to form tight contact in order to allow suction to take place and which permits attaching the cup at any position upon the teat.

The body of my teat cup or the lower member thereof comprises a tubular shell 10 which is slightly tapered and which narrows down at the bottom to form a nipple 11 to which a hose 12 from the suction line proper is attached. In the form of my invention shown in Fig. 1, this shell is provided at the top with oppositely-extending pairs of ears 13 to which are pivoted a pair of longitudinal arms 14 and 15. Arms 14 and 15 are formed so as to lie spaced from the shell 10 and terminate in flat portions 16 at the lower ends by means of which they can be pressed together and are provided at the upper portions with semicylindrical tubular members 17 and 18 which, when the handles are partially pressed together, form a part of a tube somewhat larger in diameter than the shell 10, as clearly indicated in Fig. 4. Both of the members 17 and 18 and the shell 10 are formed with beads 19 and 20 at their upper edges, over which a short length of flexible rubber tubing 21 is stretched. By pressing the arms 14 and 15 together at their extremities 16 the mouth or the opening of the teat cup formed by tube 21 and shell 10 can be varied in diameter to be applied to any size of teat.

The manner of securing the rubber tube 21 in place upon the teat cup members can best be comprehended from Figs. 1 and 6. An annular band 22 is brought about the shell 10 and the rubber 21 and is secured in place thereon adjacent the bead 20 by means of a screw 23 which acts upon ears 24 formed on the end of said band. In securing the other end of tube 21 I employ two concave strips of metal 25 which have welded thereto or formed integral therewith on the convex side a pair of small screws 26. These screws are adapted to pass through two thicknesses of the rubber tube 21, through the members 17 or 18 and through a strip 27 similar to strip 25, where the whole is firmly clamped in place by nuts 28 screwed on the exterior of the device on said screws. In this manner the tube 21 is prevented from slipping off either of the beads 19 or 20.

To limit the movement of the arms 14 and 15 a pair of thumb screws 29 are used which screw into bosses 30 formed on said arms and which engage the band 22 at the periphery thereof. By adjusting these screws the minimum opening of the teat cup mouth can be varied as desired.

The form of my invention shown in Figs. 2, 3 and 4 differs only from the form shown in Fig. 1 in the specific mounting of the arms 14 and 15 upon the cup. In this form said arms are pivoted in lugs 31 and 32 formed on the band 22 instead of directly on the teat cup. The stop in this case also differs and comprises a screw 33 for each arm which passes loosely through the lower portion of said arm and screws into bosses 34 formed on the lower portion of shell 10. This form has the advantage of requiring less delicate adjustment and of having the arms supported at two points, one at the pivot and the other at the stop screw.

The method of using the device is self evident. The arms 14 and 15 are pressed together either partially or completely, as desired, by the flat portions 16 and the cup brought up to the cow's teat. The position of the parts is clearly shown in Fig. 3. It will be noted that inasmuch as the rubber tube 21 is of somewhat smaller diameter than member 10 the mouth of the cup is not fully opened throughout its entire length, so that the teat can only be forced in as shown in dotted lines in Fig. 3. When, however, the suction is turned on the teat immediately becomes drawn in the full length, and upon releasing the arms 14 and 15 the teat takes the position shown in dotted lines in Fig. 2, which permits the cup to be held in place upon any portion of the teat through the action of the rubber tube and springs 45 positioned on screws 33.

To prevent injury to the cow's teat, due to continued suction after the milk has been completely removed I provide a valve in the bottom of the teat cup as shown in Fig. 5. The throat of the cup near the nipple 11 is enlarged at 35 and taper bored to receive a tapered valve member 36 secured upon the exterior of the cup by a nut 37 and a washer 38. Member 36 has a transverse hole 39 through it which registers with the hole 40 in the nipple 11 by means of which the suction on the teat can be regulated.

The advantages of my invention are manifest. A single cup can be used on any size teat and when once positioned thereon will remain in place until removed, whether the suction is on or off and irrespective of the size of the teat, which is usually large prior to milking and reduces in size after the milk has been removed. Furthermore, the contact between the cup and the teat is always tight and no sharp edges are present in the rubber which can mutilate or injure the teat. The length of cup and the expansible mouth prevents the end of the teat from entering the throat of the cup and so choking the milk passageway in the teat inasmuch as the cup remains positioned where placed.

I claim:

1. A teat cup comprising a hollow body portion, a flexible tube attached to said body portion by an annular band, a pair of arms pivoted in lugs on said annular band and terminating in segmental annular members extending above said body portion and attached to said flexible tube, and means for terminating the inward movement of said arms embodying a screw for each arm passing loosely through the lower portion of same and screwed into a boss on the lower portion of said teat cup.

2. A teat cup comprising a hollow body portion, a pair of arms pivoted to the sides of said body portion and terminating in segmental annular members extending above said body portion, a flexible tube attached to said body portion and said annular members, and means for terminating the movement of said arms.

In testimony whereof I affix my signature in presence of two witnesses.

KENNETH K. McLEOD.

Witnesses:
  F. A. WHITELEY,
  H. A. BOWMAN.

Copies of this patent may be obtained for five cents each, by addressing the "Commissioner of Patents, Washington, D. C."